(12) United States Patent
Chang

(10) Patent No.: US 11,950,655 B2
(45) Date of Patent: Apr. 9, 2024

(54) SHOE INSOLE AND PROCESSING METHOD FOR SHOE INSOLE

(71) Applicant: DAH SHENG CHEMICAL INDUSTRY CO., LTD., Taichung (TW)

(72) Inventor: Heng-Tai Chang, Taichung (TW)

(73) Assignee: DAH SHENG CHEMICAL INDUSTRY CO., LTD., Taichung (TW)

( * ) Notice: Subject to any disclaimer, the term of this patent is extended or adjusted under 35 U.S.C. 154(b) by 321 days.

(21) Appl. No.: 17/325,976

(22) Filed: May 20, 2021

(65) Prior Publication Data

US 2022/0312894 A1 Oct. 6, 2022

(30) Foreign Application Priority Data

Mar. 31, 2021 (TW) .................................. 110111987

(51) Int. Cl.
*A43B 17/00* (2006.01)
*B29D 35/00* (2010.01)
(Continued)

(52) U.S. Cl.
CPC ........ *A43B 17/006* (2013.01); *B29D 35/0054* (2013.01); *B29D 35/12* (2013.01); *B29D 35/122* (2013.01); *B29D 35/14* (2013.01)

(58) Field of Classification Search
CPC .. A43B 17/006; B29D 35/0054; B29D 35/12; B29D 35/122; B29D 35/14; B29D 35/142
(Continued)

(56) References Cited

U.S. PATENT DOCUMENTS 5,179,792 A * 1/1993 Brantingham ....... A43B 13/203
36/71
5,687,441 A * 11/1997 Rachman ............... A43B 13/38
12/142 N
(Continued)

FOREIGN PATENT DOCUMENTS

CN 201451653 U 5/2010
CN 201878898 U 6/2011

OTHER PUBLICATIONS

Tanabe, Y. et al., JP-2019080965-A, with attached machine-translation to English by Clarivate Analytics 2023, Published May 30, 2019. (Year: 2019).*

*Primary Examiner* — S. Behrooz Ghorishi
*Assistant Examiner* — Gregory C. Grosso
(74) *Attorney, Agent, or Firm* — MUNCY, GEISSLER, OLDS & LOWE, PC

(57) ABSTRACT

A shoe insole and processing method for shoe insole are disclosed. The insole includes an insole body for the stepping of the sole of one human foot. The insole body includes an upper insole layer having a top surface and an opposing bottom surface, a lower insole layer and a bulge. The upper insole layer is cold pressed to form bulges on the upper insole layer corresponding to different areas of the structure of the human foot. Then, the lower insole layer is bonded to the bottom surface of the upper insole layer, and then, perform cold pressing forming. Each bulge has a first convex surface and a first concave surface. The top surface of the upper insole layer integrally raised to form a first convex surface. The bottom surface of the upper insole layer integrally dented corresponding to the first convex surface to form a first concave surface.

8 Claims, 10 Drawing Sheets

(51) Int. Cl.
*B29D 35/12* (2010.01)
*B29D 35/14* (2010.01)

(58) Field of Classification Search
USPC .......................................... 156/228
See application file for complete search history.

(56) References Cited

U.S. PATENT DOCUMENTS

| | | | |
|---|---|---|---|
| 5,894,687 A | 4/1999 | Lin | |
| 5,950,332 A * | 9/1999 | Lain | A43B 17/035 |
| | | | 36/35 B |
| 6,176,025 B1 * | 1/2001 | Patterson | A43B 7/1445 |
| | | | 36/35 B |
| 9,119,439 B2 * | 9/2015 | Brandt | B29C 51/105 |
| 10,136,699 B1 * | 11/2018 | Tse | A43B 17/026 |

* cited by examiner

SHOE INSOLE AND PROCESSING METHOD FOR SHOE INSOLE

BACKGROUND OF THE INVENTION

1. Field of the Invention

The present invention relates to shoe insole technology and more particularly, to a shoe insole with a special structure and a processing method for shoe insoles.

2. Description of the Related Art

As disclosed in China Patent No. CN201451653U "Breathable shoe insole" and China Patent No. CN201878898U "EVA shoe insole", these prior technologies are designed to provide a shoe insole that maintains a good air convection effect of the insole through several air grooves, achieving sweat absorption and keeping the soles of the feet dry for a long time. However, it is unable to provide adequate cushioning to the stress points on the bottom of the sole of the foot, such as the heel, arch and metatarsal, to relieve the soreness of the feet caused by walking, and it is not possible to evenly distribute the pressure on the feet for those who stand for a long time, and reduce the foot pain caused by standing for a long time.

Also as disclosed in the US Patent No. US5894687A "shoe pad having massaging effect", the shoe pad corresponding to the heel and metatarsal portion of the sole structure has liquid convex parts that provide a pressure transmission device and a plurality of hollow convex parts that provide a massage function. The two liquid convex parts have corresponding grooves respectively placed on the first pad layer and the second layer of the insole. The two grooves are equipped with liquid, and a connecting channel is formed between the two liquid convex parts. The manufacturing process of such liquid convex parts is cumbersome. These hollow convex parts are filled with air. Although they can massage the soles of the feet, they are likely to collapse or leak due to the weight of the human body after a long time of use.

SUMMARY OF THE INVENTION

The present invention has been accomplished under the circumstances in view. It is the main object of the present invention to provide a shoe insole processing method for insole processing, which can simplify the previous insole processing technology's manufacturing process and reduce manufacturing costs, and can improve the service life of the insole.

To achieve this and other objects, the invention provides a shoe insole processing method for making an insole. The insole comprises an insole body. The insole body comprises an upper insole layer and a lower insole layer. The upper insole layer has a top surface and an opposing bottom surface. The shoe insole processing method comprises the steps of: a) cold pressing said upper insole layer to form a groove on said upper insole layer at a position corresponding to at least one of the heel portion, inner arch portion, outer arch portion, inner metatarsal portion, outer metatarsal portion, inner toe portion and outer toe portion of the structure of the human foot, the groove being located in the bottom surface of the upper insole layer; b) bonding the lower insole layer to the bottom surface of the upper insole layer; and c) performing cold pressing forming. In an alternate form of the present invention, the shoe insole processing method comprises the steps of a) bonding at least one foam to the bottom surface of the upper insole layer at positions corresponding to at least one of the heel portion, inner arch portion, outer arch portion, inner metatarsal portion, outer metatarsal portion, inner toe portion and outer toe portion of the structure of the human foot; b) bonding the lower insole layer to the bottom surface of the upper insole layer; and c) performing cold pressing forming.

Preferably, in step a), a plurality of grooves are formed in the upper insole layer, and a concave runner is formed between each two adjacent grooves to connect the grooves.

Preferably, before step b), cut a foam and place the foam in the groove, which is located between the groove and the lower insole layer.

Preferably, before step b), cut a foam and place the foam in the concave runner, which is located between the concave runner and the lower insole layer.

Preferably, the depth of the concave runner is shallower than the depth of the grooves.

Preferably, in step a), bonding at least two foams to the bottom surface of the upper insole layer, and bonding an elongated foam between each two foams. The elongated foam has two opposite ends thereof respectively connected to the two foams.

Preferably, each foam has a gap formed therein. The gap defines an air cavity.

Preferably, before performing cold pressing forming, a heating step is performed, and the heating temperature of the heating step is set between 120° C. and 160° C.

Preferably, in step c), the temperature of cold pressing forming is controlled below 30° C., the cold pressing time is 50 to 70 seconds, and the pressure is 50 kg/cm$^2$.

Preferably, the upper insole layer and the lower insole layer are formed of a copolymer foam material.

In the present invention, the insole is made by cold pressing forming, and the overall process can achieve high productivity at room temperature, and there is no need to consider the heat resistance requirements of the material, which can effectively simplify the process.

It is the main object of the present invention to provide a shoe insole that can provide appropriate resilience and support to the stress points on the bottom of the sole. By increasing the air circulation inside the insole body, the insole can conform to the supporting foot shape while preventing the bulge of the insole from collapsing or leaking.

To achieve this and other objects, the invention provides a shoe insole made by the aforesaid shoe insole processing method. The insole comprises an insole body for the stepping of the sole of a human foot. The insole body comprises a forefoot area, a midfoot area and a hindfoot area. The hindfoot area comprises a heel portion corresponding to the calcaneus of the human foot. The forefoot area comprises an inner metatarsal portion, an outer metatarsal portion, an inner toe portion and an outer toe portion. The inner metatarsal portion corresponds to the first metatarsal of the human foot. The outer metatarsal portion corresponds to the second, third, fourth and fifth metatarsals of the human foot. The inner toe portion corresponds to the first phalanx, of the human foot. The outer toe portion corresponds to the second, third, fourth and fifth phalanx of the human foot. The midfoot area is located between the forefoot area and the hindfoot area. The midfoot area comprises an inner arch portion and an outer arch portion. The insole body comprises an upper insole layer comprising a top surface and an opposing bottom surface, a lower insole layer bonded to the bottom surface of the upper insole layer, and at least one bulge located on the upper insole layer corresponding to at least one of the forefoot area, the midfoot area and the hindfoot area. Each bulge comprises a first convex surface and a first concave surface. The top surface of the upper insole layer is integrally raised to form the first convex surface. The bottom surface of the upper insole layer is integrally dented corresponding to the first convex surface to form a first concave surface. The first concave surface defines a groove. The groove is located between the upper insole layer and the lower insole layer. Each bulge is in a compressed state when compressed by an external force, and each bulge is in a diastolic state when the external force is released therefrom.

Preferably, the bulge further comprises a foam located between the groove and the lower insole layer.

Preferably, the at least one bulge is located in at least two of the forefoot area, the midfoot area and the hindfoot area. At least one air flow channel is formed between the upper insole layer and the lower insole layer. The at least one air flow channel connects the at least one bulge. Each air flow channel comprises a second convex surface and an opposing second inner concave surface. The top surface of the upper insole layer is integrally raised to form the second convex surface. The bottom surface of the upper insole layer is integrally dented to form the second convex surface, and the concave surface defines a concave runner.

Preferably, the air flow channel further comprises a foam set between the concave runner and the lower insole layer.

Preferably, the foam comprises a gap therein. The gap defines an air cavity. The air cavity is filled with air.

Preferably, the thickness of the lower insole layer is larger than the thickness of the upper insole layer.

Preferably, the thickness of the bulge located in the hindfoot area is thicker than the thickness of the bulge located in the forefoot area.

Preferably, the air flow channel further comprises an extension section. The extension section has one end thereof connecting one bulge, and an opposite end thereof connecting the air flow channel.

Preferably, the insole further comprises a plurality of bulges. The forefoot area comprises a first circular path. The midfoot area comprises a second circular path.

The hindfoot area comprises a third circular path. The bulges are arranged along at least one of the first circular path, the second circular path and the third circular path.

Preferably, the insole further comprises a plurality of air flow channels. The air flow channels are arranged along at least one of the first circular path, the second circular path and the third circular path, and connect the bulges.

Preferably, the insole further comprises a plurality of bulges longitudinally arranged between the first circular path, the second circular path and the third circular path, wherein the air flow channels connect the bulges.

The detailed structure, characteristics, assembly or use of the shoe insole and processing method for shoe insoles provided by the present invention will be described in the subsequent detailed description of the preferred embodiment. However, those with ordinary skill in the art should be able to understand that the description and the specific example listed in the preferred embodiment of the present invention are only used to illustrate the present invention, not to limit the scope of patent applications for the present invention.

DETAILED DESCRIPTION OF THE INVENTIO

The applicant first explains here, the following is a detailed description of the technical content and features of the invention based on several preferred embodiments listed in conjunction with the drawings. The directional adjectives such as "top, bottom, up, down, inside, outside" mentioned in the content of this manual are only exemplary descriptive terms based on the normal direction of use, and are not intended to limit the scope of claims. Secondly, in the embodiments and drawings that will be introduced below, the same element numbers represent the same or similar elements or their structural features.

Figure 1:
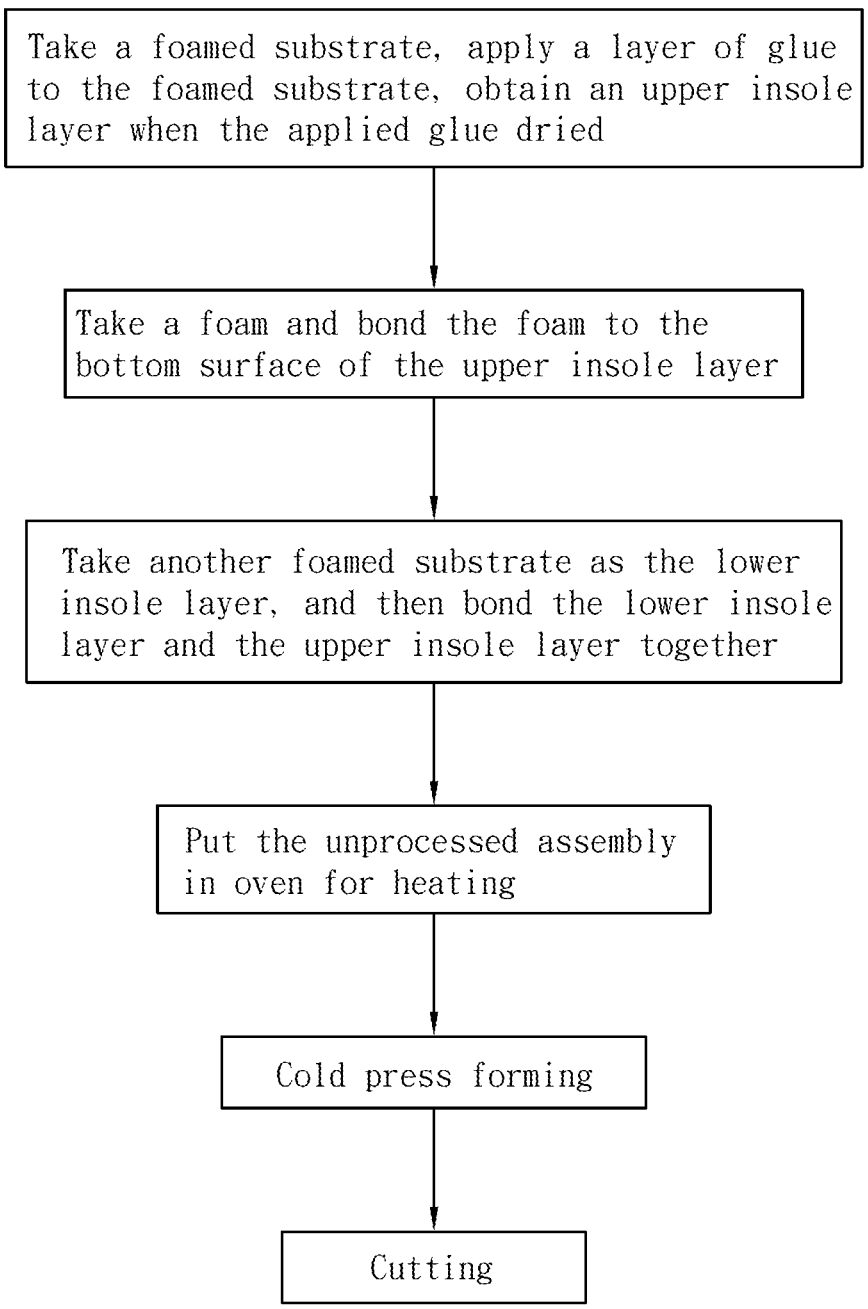
FIG. 1 is a flow chart of a shoe insole processing method of a first embodiment of the present invention.
Figure 2:
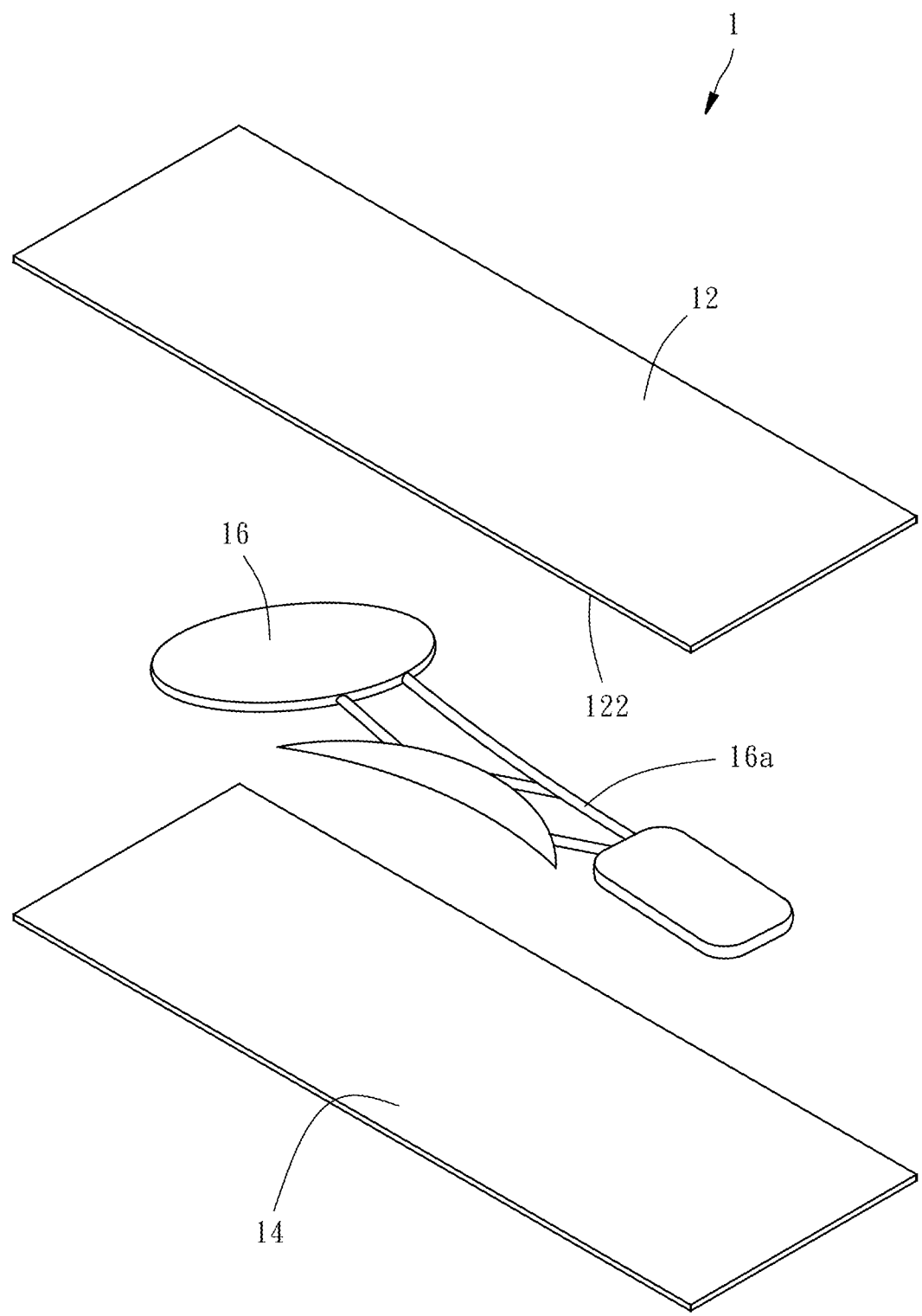
FIG. 2 is an exploded view of an insole before processing by the shoe insole processing method of the first embodiment of the present invention.
Figure 9:
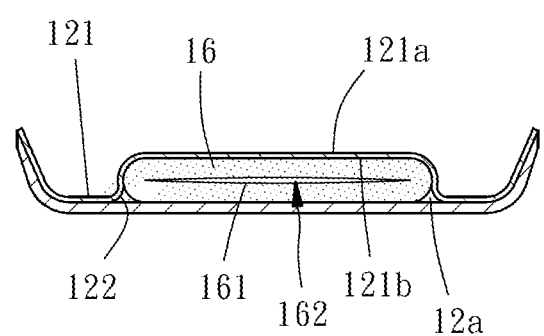
FIG. 9 is a sectional view taken along line 9-9 of FIG. 6.

Please refer to FIG. 1, FIG. 2 and FIG. 9, which are the first embodiment of the shoe insole processing method of the present invention. The shoe insole processing method comprises the steps of: step a) attaching foams 16 to a bottom surface 122 of an upper insole layer 12, corresponding to the heel portion 42, the inner arch portion 32a, and the metatarsal portion 22 of the structure of the human foot, step b) attaching a lower insole layer 14 to the bottom surface 122 of the upper insole layer 12, and step c) perform cold pressing forming.

In detail, the insole 1 processing method provided by the first embodiment of the present invention includes an insole body 10. First, take a foamed substrate as the upper insole layer 12 of the insole body 10. The foamed substrate is a breathable and elastic material such as ethylene-vinyl acetate copolymer (EVA) as an example. First, apply a layer of glue to the bottom surface 122 of the unprocessed upper insole layer 12. While it is drying, cut foams 16 and an elongated foams 16a, and cut a gap 161 between each foam 16 and the respective elongated foams 16a, and the gap 161 defines an air cavity 162. After attaching the foams 16 with the air cavity 162 to the positions corresponding to the heel portion 42, the inner arch portion 32a, and the metatarsal portion 22, attach the elongated foams 16a between the foams 16 corresponding to the metatarsal portion 22 and the heel portion 42, the foams 16 corresponding to the metatarsal portion 22 and of the inner arch portion 32a, and the foams 16 corresponding to the inner arch portion 32a and the heel portion 42. It is also possible to attach two foams 16 in parallel to the groove 12a and the concave runner 12b to form the gap 161. Then, attach the lower insole layer 14 to the bottom surface 122 of the upper insole layer 12. After the semi-finished product of the insole body 10 is prepared, it is heated in an oven, and the heating temperature is controlled at 120-160° C. After the semi-finished product is softened, it is cold-pressed and shaped. The molding time is 50-70 seconds, and the pressure is set at about 40-55 kg/cm². After shape forming, cut to make the insole 1.

After the insole 1 processed by the insole 1 processing method provided by the first embodiment is taken out from the cold pressing mold, the insole 1 is forced to bulge outward by the foams 16 and the elongated foams 16a between the upper insole layer 12 and the lower insole layer 14, forming bulges 18 and air flow channels 19.

Figure 3:
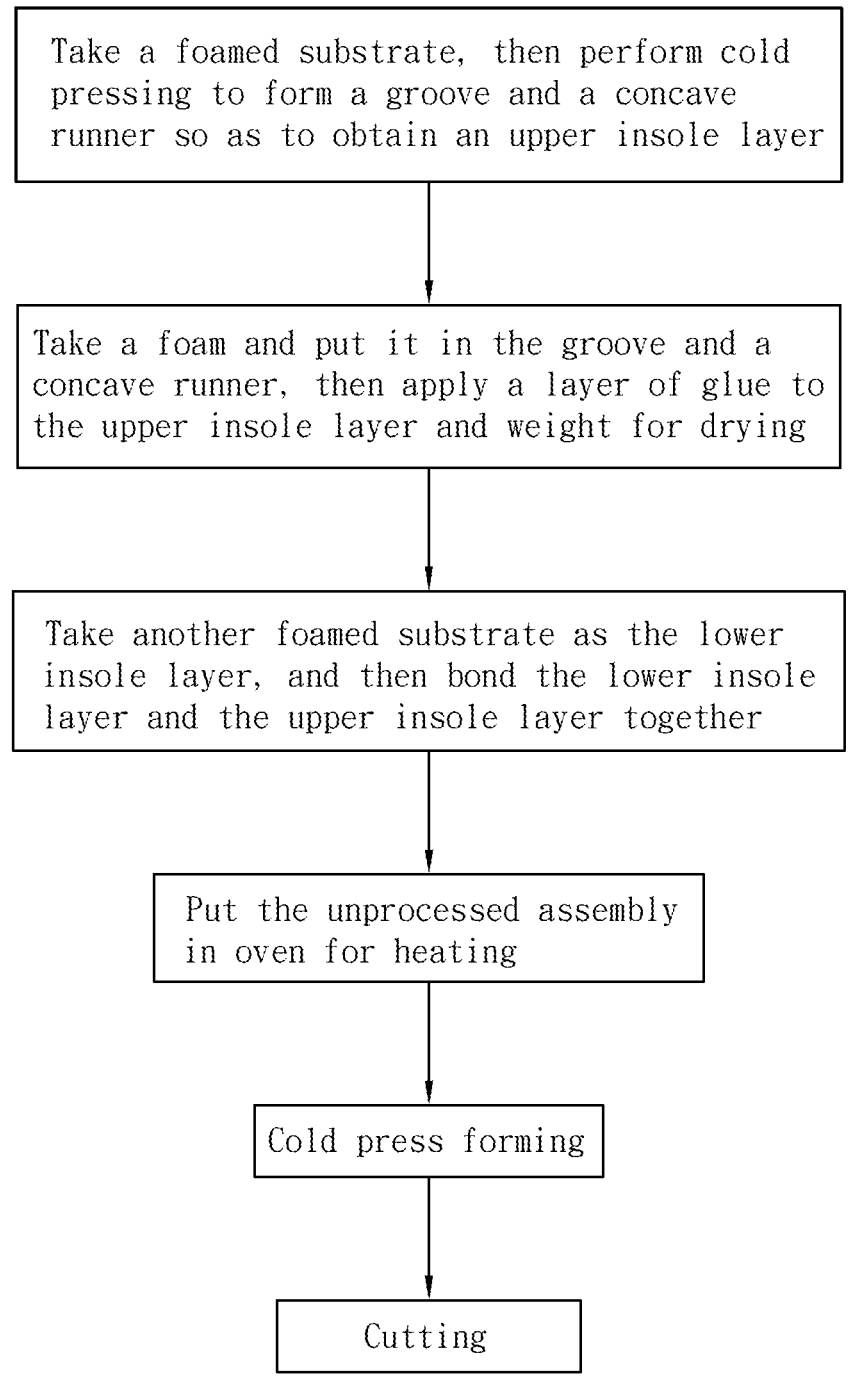
FIG. 3 is a flow chart of a shoe insole processing method of a second embodiment of the present invention.
Figure 4:
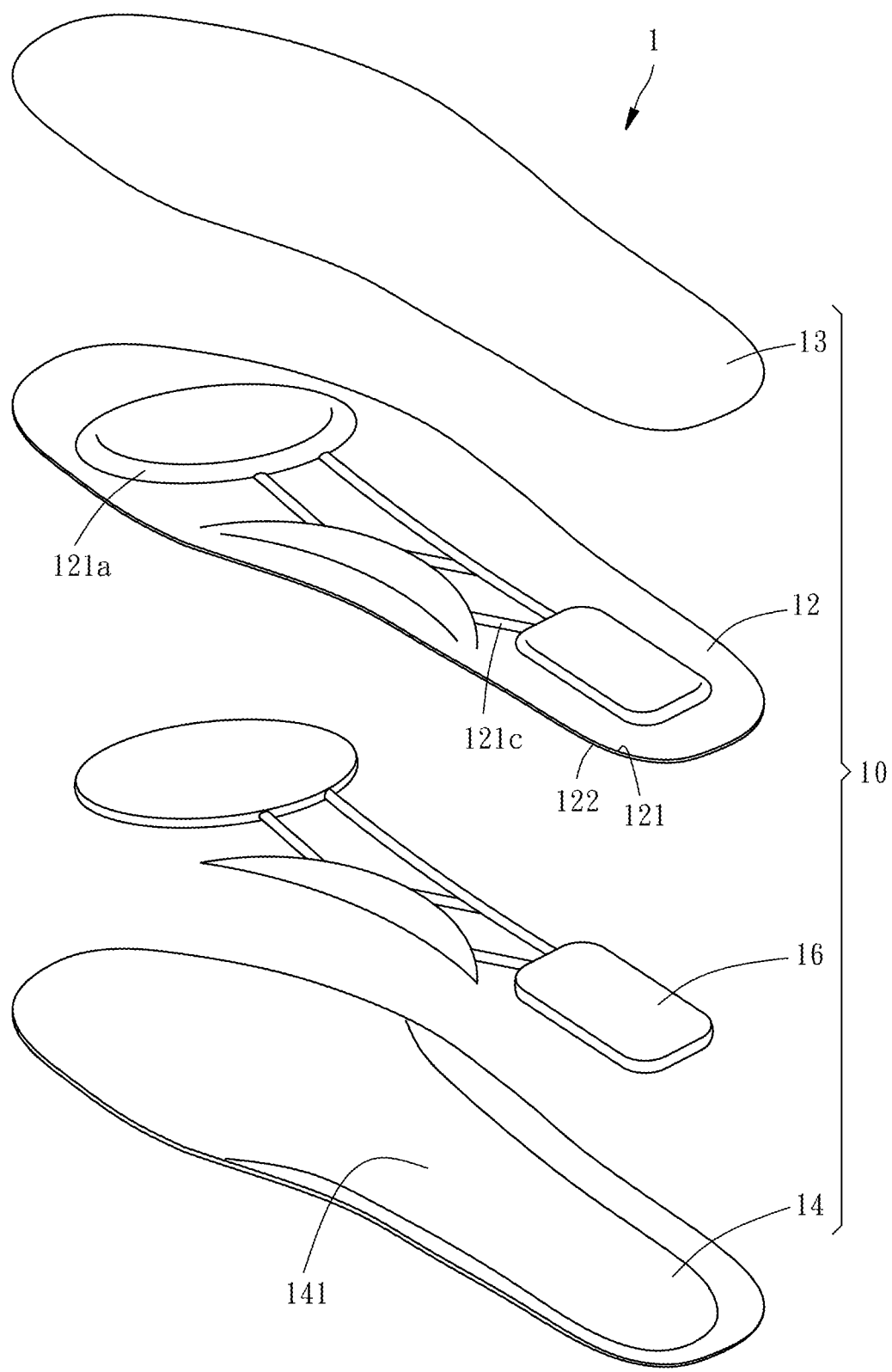
FIG. 4 is an exploded view of an insole made by the shoe insole processing method of the second embodiment of the present invention.
Figure 5:
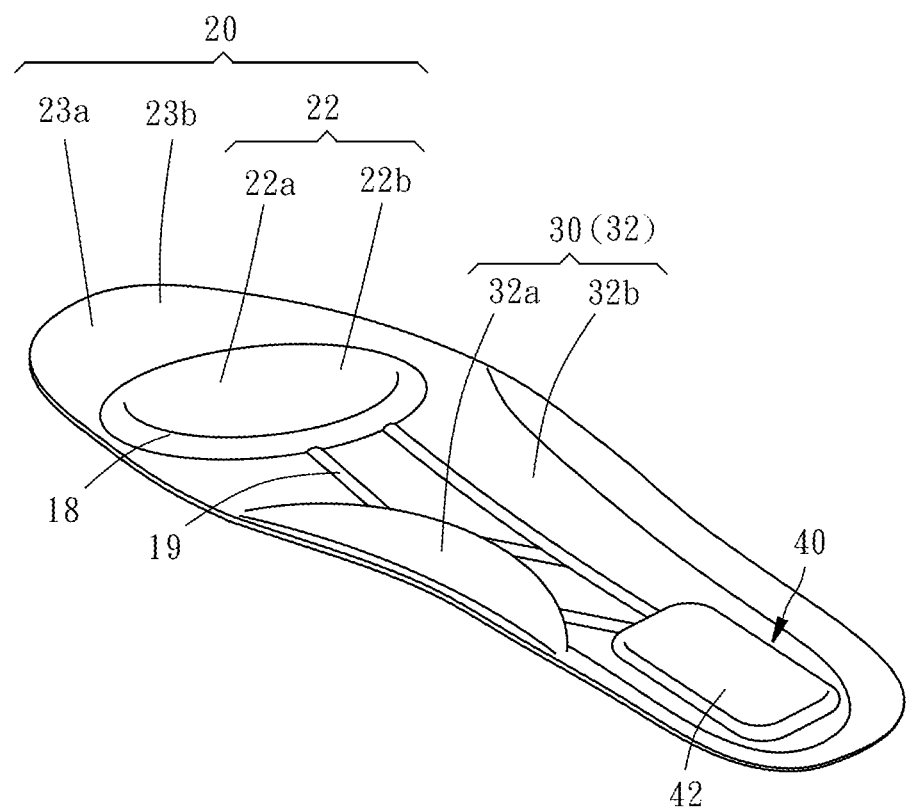
FIG. 5 is an oblique top elevational view of the insole provided by the present invention, mainly showing the parts of the insole corresponding to the structure of the human foot.
Figure 6:
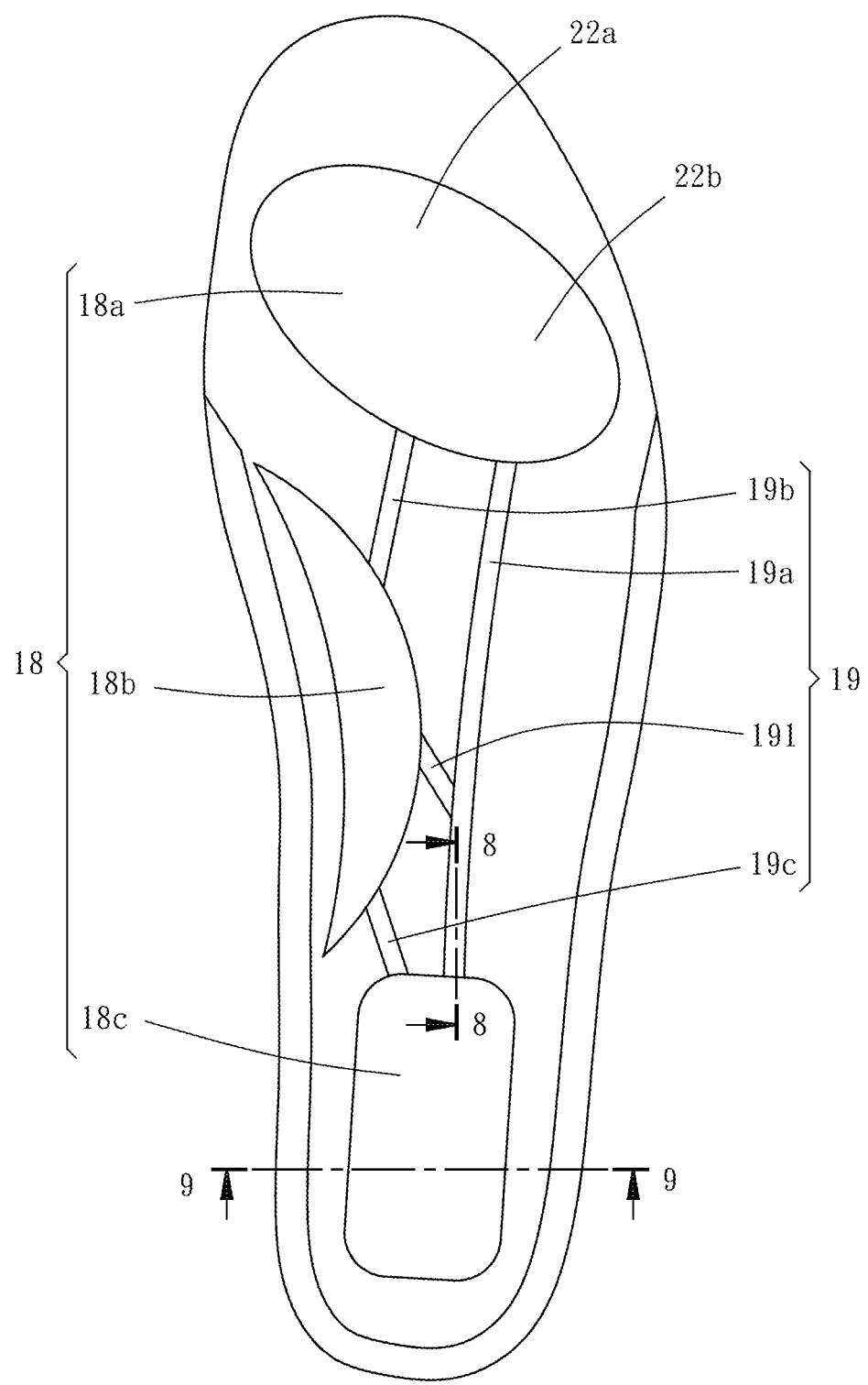
FIG. 6 is a top plan view of an insole made by the shoe insole processing method of the first or second embodiment of the present invention.
Figure 7:
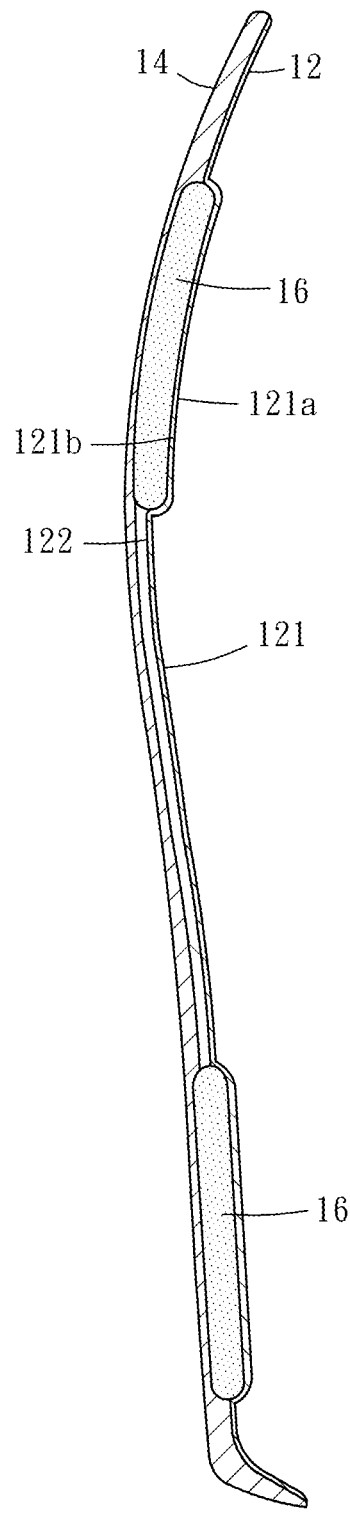
FIG. 7 is a schematic side view of the insole, showing the positions of the foams in the insole.
Figure 8:
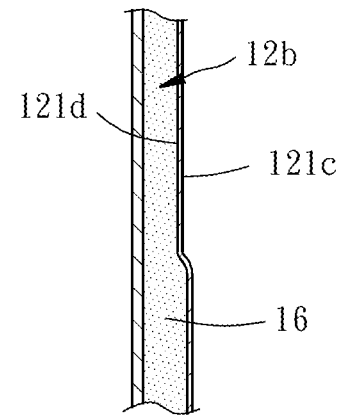
FIG. 8 is a sectional view taken along line 8-8 of FIG. 6.

Please refer to FIGS. 3-5, which are the second embodiment of the shoe insole processing method of the present invention. The shoe insole processing method comprises the steps of: step a) perform cold pressing forming on a foamed substrate to form an upper insole layer 12 with a groove 12a and a concave runner 12b, step b) after attaching foams 16 to the groove 12a, attach a lower insole layer 14 to the bottom surface 122 of the upper insole layer 12, and step c) heating and cold pressing forming, cutting to make insole 1. Specifically, a first mold (not shown in the drawings) is used to fill a foamed substrate into the first mold (not shown in the drawings), and the mold is closed and cold pressed to obtain the upper insole layer 12. During cold pressing forming, bulges 18 and air flow channels 19 are formed in the upper insole layer 12 corresponding to the heel portion 42, inner arch portion 32a, and metatarsal portion 22 of the sole structure subject to the shape of the first mold, as shown in FIG. 5. Wherein, each bulge 18 integrally protrudes toward the top surface 121 of the upper insole layer 12 to form a first convex surface 121a, and a first concave surface 121b dented on the bottom surface 122 of the upper insole layer 12 corresponding to the first convex surface 121a. The first concave surface 121b defines a groove 12a. The concave runner 12b is connected between each of the bulges 18 to form an air flow channel 19 (described in the embodiment of the insole structure below), that is, the first cold pressing process is completed. Then remove the upper insole layer 12 from the mold. It should be noted that the depth of bulges 18 of cold pressing is slightly deeper than that of air flow channel 19. Next, cut foams 16 and elongated foams 16a with air cavity 162, and paste them into the groove 12a and the concave runner 12b. At the same time, take another foamed substrate as the lower insole layer 14 of the insole 1, and glue the bottom surface 122 of the upper insole layer 12 with the foams 16 and the bonding surface 141 of the lower insole layer 14 respectively. After drying, the upper insole layer 12 and the lower insole layer 14 are bonded to each other to make the foams 16 located between the upper insole layer 12 and the lower insole layer 14. It should be noted that the foams 16 in the groove 12a and the elongated foams 16a in concave runner 12b can be connected to each other or separate foams 16.

Put the laminated upper insole layer 12, lower insole layer 14 and foams 16 into an oven for heating. The heating temperature is controlled at 120-160° C. to soften the upper insole layer 12 and the lower insole layer 14 to obtain the semi-finished product of insole body 10. At this time, the foams 16 are located between the groove 12a of the upper insole layer 12 and the lower insole layer 14, forming bulges 18, and the elongated foams 16a are located between the concave runner 12b and the lower insole layer 14, forming an air flow channel 19. In addition, when the semi-finished product of the insole body 10 is still in a high temperature state, a breathable fabric 13 is attached to the top surface 121 of the upper insole layer 12 and used as the upper in contact with the sole of the foot.

Next, perform secondary cold pressing forming on insole body 10. The second mold of the secondary cold pressing forming is made by 1:1 according to the specifications of the last. The second mold has mold cavities located at positions corresponding to the bulges 18 and air flow channel 19 of the upper insole layer 12, and the module corresponding to the lower insole layer 14 does not have any mold cavity. Fill the semi-finished product of the softened insole body 10 into the second mold, so that the bulges 18 and air flow channel 19 of the upper insole layer 12 are placed in the mold cavities. After the mold is closed, cold pressing forming is performed at a temperature below 30° C., the molding time is 50 to 70 seconds, and the pressure is set at about 40 to 55 kg/cm². Open the mold and take out the insole body 10, and use a cutting knife to cut the contour of the insole body 10 to obtain the insole 1. The insole body 10 after high-pressure sealing and molding, due to the push of the foams 16 in the groove 12a and the convex runner 12b, the lower insole layer 14 is forced to bulge outward at the positions corresponding to bulges 18 and air flow channel 19 of the upper insole layer 12. When the air in the insole body 10 is subjected to high pressure processing in the second mold, it is forced to be discharged into the air cavities 162 of the foams 16, so that the air cavities 162 is filled with air.

What needs to be explained is that the manufacturer can optionally add foams 16 to the groove 12a and the concave runner 12b after forming the upper insole layer 12, or directly bond the lower insole layer 14 to the bottom surface 122 of the upper insole layer 12 that is provided with the groove 12a and the concave runner 12b, so that air is filled between the groove 12a of the upper insole layer 12 and the lower insole layer 14, and between the concave runner 12b and the lower insole layer 14, forming bulges 18 that can be deformed between the compressed state and the diastolic state. In this way, when the user is stepping on, the bulges 18 can generate air circulation through the air flow channel 19.

Below, the insole 1 structure processed by the insole 1 processing method provided by the first or second embodiment of the present invention will be further explained. Please refer to FIGS. 4 to 9, which are the first embodiment of the insole 1 of the present invention. The insole 1 comprises an insole body 10. The insole body 10 comprises an upper insole layer 12 and a lower insole layer 14, the top surface 121 of the upper insole layer 12 is in contact with the sole of the foot, and the bottom surface 122 of the upper insole layer 12 is bonded to the lower insole layer 14 through cold pressing forming. The material of upper insole layer 12 and the lower insole layer 14 is a breathable and elastic foam material such as ethylene-vinyl acetate copolymer (EVA) as an example.

The insole body 10 of the first embodiment comprises a forefoot area 20, a midfoot area 30, and a hindfoot area 40.

The hindfoot area 40 comprises a heel portion 42, corresponding to the calcaneus of the human foot. The forefoot area 20 comprises an inner metatarsal portion 22a, an outer metatarsal portion 22b, an inner toe portion 23a, and an outer toe portion 23b. The inner metatarsal portion 22a corresponds to the first metatarsal of the human foot. The outer metatarsal portion 22b corresponds to the second, third, fourth and fifth metatarsals of the human foot. The inner toe portion 23a corresponds to the first phalanx of the human foot. The outer toe portion 23b corresponds to the second, third, fourth and fifth phalanx of the human foot. The midfoot area 30 is located between the forefoot area 20 and the hindfoot area 40. The midfoot area 30 comprises an inner arch portion 32a and an outer arch portion 32b.

The bulges 18 of the upper insole layer 12 of the insole body 10 of the first embodiment further comprises a first bulge 18a, a second bulge 18b, and a third bulge 18c. The first bulge 18a is formed in the inner metatarsal portion 22a and outer metatarsal portion 22b of the forefoot area 20. The second bulge 18b is formed in the inner arch portion 32a of the midfoot area 30. The third bulge 18c is formed in the heel portion 42 of the hindfoot area 40. The area of the top surface 121 of the upper insole layer 12 covering the bulges 18 bulges outward to form a first convex surface 121a. The area of the bottom surface 122 of the upper insole layer 12 covering the bulges 18 dents to form a first concave surface 121b. The first concave surface 121b defines a groove 12a for attaching a foam 16. The foam 16 can be memory foam or other foam 16 with good resilience, support and shock absorption function. The foam 16 has a gap 161, which defines an air cavity 162. In addition, connect an air flow channel 19 between each of the first, second and third bulges 18a, 18b, and 18c. The area of the top surface 121 of the upper insole layer 12 covering the air flow channel 19 is integrally convex outward to form a second convex surface 121c. The area of the bottom surface 122 of the upper insole layer 12 covering the air flow channel 19 and corresponding to the second convex surface 121c is integrally recessed to form a second inner concave surface 121d. The second inner concave surface 121d defines a concave runner 12b. There is a foam 16 inside each concave runner 12b. The air flow channel 19 comprises a first air flow channel 19a, a second air flow channel 19b and a third air flow channel 19c. In detail, one end of the first air flow channel 19a is connected to the first bulge 18a at the position of the outer metatarsal portion 22b, and the other end of the first air flow channel 19a is connected to the third bulge 18c. One end of the second air flow channel 19b is connected to the first bulge 18a at the position of the inner metatarsal portion 22a, and the other end of the second air flow channel 19b is connected to the second bulge 18b. One end of the third air flow channel 19c is connected to the second bulge 18b, and the other end of the third air flow channel 19c is connected to the third bulge 18c. The first air flow channel 19a further comprises an extension section 191, connecting the first air flow channel 19a and the second bulge 18b. It is worth mentioning that the depth of the groove 12a is deeper than that of the concave runner 12b.

The lower insole layer 14 is attached to the bottom surface 122 of the upper insole layer 12, so that the foams 16 are located between the groove 12a and the lower insole layer 14 of the upper insole layer 12, and between the convex runner 12b and the lower insole layer 14. When the upper insole layer 12 and the lower insole layer 14 are shape formed by high pressure sealing, the lower insole layer 14 corresponding to the first bulge 18a, second bulge 18b and third bulge 18c of the upper insole layer 12 is forced by the foam 16 in the groove 12a to bulge outward, and the lower insole layer 14 corresponding to the first air flow channel 19a, second air flow channel 19b and third air flow channel 19c of the upper insole layer 12 is forced by the foam 16 in the concave runner 12b to bulge outward, so that the foams 16 are fixedly attached to the inside of the first bulge 18a, the second bulge 18b, the third bulge 18c, the first air flow channel 19a, the second air flow channel 19b and the third air flow channel 19c. The air cavity 162 in each foam 16 is filled with air, so that the foams 16 can be deformed between the compressed state and the diastolic state. It is worth mentioning that the thickness of the third bulge 18c located in the heel portion 42 is thicker than the thickness of the first bulge 18a located in the inner metatarsal portion 22a and the outer metatarsal portion 22b, and the thickness of the upper insole layer 12 is thinner than the thickness of the lower insole layer 14.

In actual use of the insole 1 of the first embodiment, when the heel portion 42 of the insole body 10 is stressed, the foam 16 in the third bulge 18c will be squashed to a compressed state, so that the air in the air cavity 162 of the foam 16 is squeezed out of the third bulge 18c and passes through the first air flow channel 19a and the third air flow channel 19c into the air cavities 162 of the foams 16 in the first bulge 18a and the second bulge 18b, making the first bulge 18a and second bulge 18b form a diastolic state. Conversely, when the inner metatarsal portion 22a and the outer metatarsal portion 22b are stressed, the foam 16 in the first bulge 18a will be squeezed to a compressed state, so that the air in the air cavity 162 of the foam 16 is squeezed out of the first bulge 18a and passes through the first air flow channel 19a and the second air flow channel 19b into the air cavities 162 of the foams 16 in the second bulge 18b and the third bulge 18c, making the second bulge 18b and the third bulge 18c form a diastolic state.

In this way, when the soles of the feet step on and off the ground repeatedly, through the support of the foams 16 and the air convection of the air cavities 162, the insole 1 of the present invention can easily restore the bulges 18 and the air flow channel 19 to a raised state, avoiding the insole 1 from being crushed by the weight of the human body after a long time of use.

In addition, the air cavity 162 of the foam 16 located in the second bulge 18b at the inner arch portion 32a performs air convection with the air cavities 162 in the first bulge 18a and the third bulge 18c, so that the foam 16 form a diastolic state to provide support for the inner arch portion 32a, reducing the internal rotation of the foot. The high resilience foams 16 have an appropriate pressure release speed, and provide appropriate cushioning for the stress points on the bottom of the foot, such as the heel portion, the arch of the foot and the metatarsal portion, so that the bottom of the foot and the insole 1 are more compliant.

Figure 10:
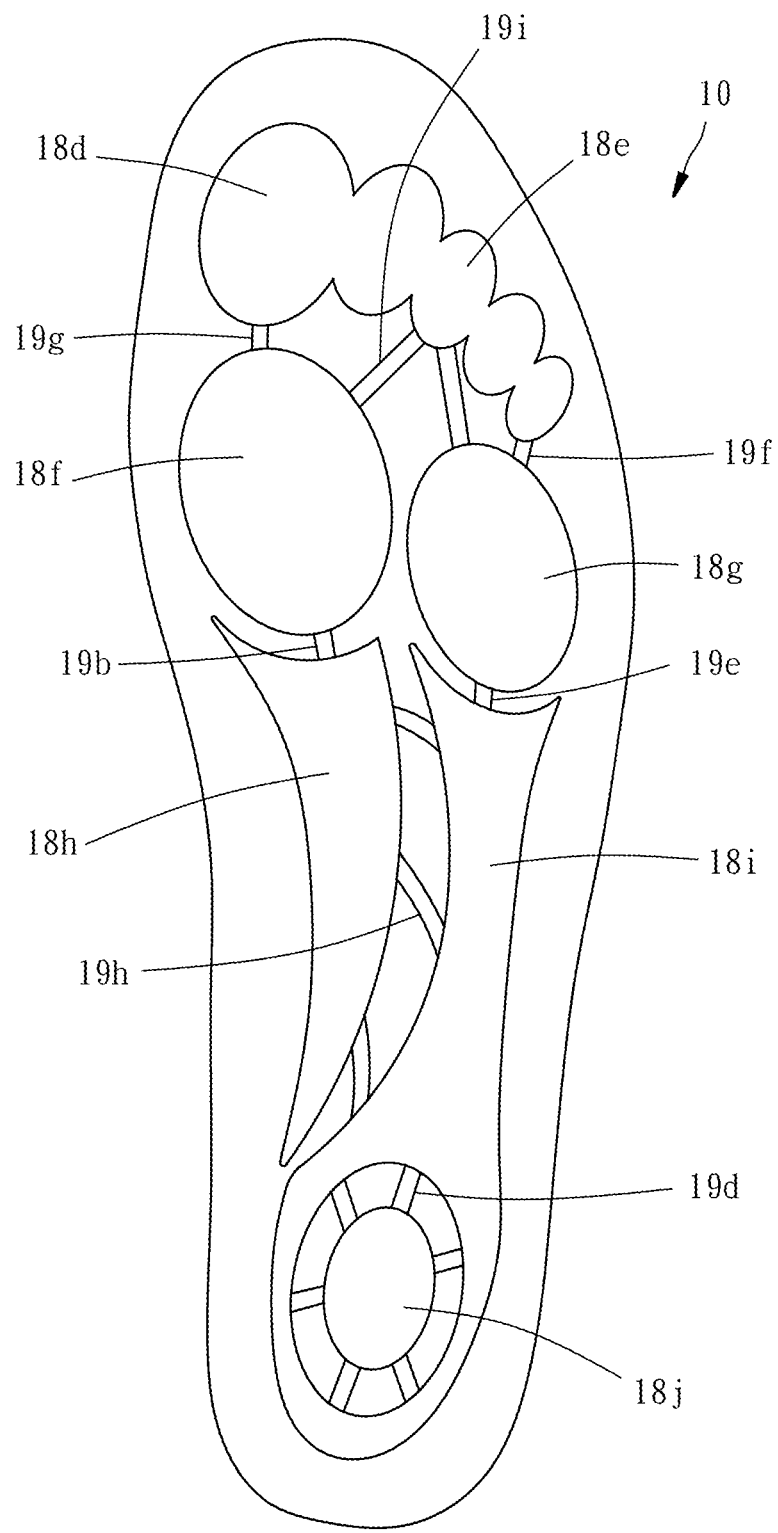
FIG. 10 is a top plan view of the insole provided by the second embodiment of the present invention, showing another aspect of the insole processed according to the insole processing method provided by the first or second embodiment of the present invention.

Please refer to FIG. 10, which is the insole 1 provided by the second embodiment of the present invention, in which the material, distinguishing parts and components of the insole body 10 are exactly the same as those of the aforementioned first embodiment, so the applicant will not repeat them, but only the differences from the aforementioned first embodiment are explained.

In the second embodiment of the present invention, the bulges 18 of the upper insole layer 12 of the insole body 10 further comprises a fourth bulge 18d, a fifth bulge 18e, a sixth bulge 18f, a seventh bulge 18g, an eighth bulge 18h, a ninth bulge 18i and a tenth bulge 18j. The fourth bulge 18d is formed in the inner toe portion 23a of the forefoot area 20. The fifth bulge 18e is formed in the outer toe portion 23b of the forefoot area 20. The sixth bulge 18f is formed in the inner metatarsal portion 22a of the forefoot area 20. The seventh bulge 18g is formed in the outer metatarsal portion 22b of the forefoot area 20. The eighth bulge 18h is formed in the inner arch portion 32a of the midfoot area 30. The ninth bulge 18 is formed in the outer arch portion 32b of the midfoot area 30. The tenth bulge 18j is formed in the heel portion 42 of the hindfoot area 40. In addition, the air flow channel 19 of this embodiment further comprises a second air flow channel 19b, a fourth air flow channel 19d, a fifth air flow channel 19e, a sixth air flow channel 19f, a seventh air flow channel 19g, an eighth air flow channel 19h and a ninth air flow channel 19i. The second air flow channel 19b connects the sixth bulge 18f and the eighth bulge 18h. The fourth air flow channel 19d connects the ninth bulge 18i and the tenth bulge 18j. The fifth air flow channel 19e connects the seventh bulge 18g and the ninth bulge 18i. The sixth air flow channel 19f connects the fifth bulge 18e and the seventh bulge 18g. The seventh air flow channel 19g connects the fourth bulge 18d and the sixth bulge 18f. The eighth air flow channel 19h connects the eighth bulge 18h and the ninth bulge 18i. The ninth air flow channel 19i connects the fifth bulge 18e and the sixth bulge 18f.

In actual use of the insole 1 of the second embodiment, in addition to having the fourth-tenth bulges (18d-18j) as described in the first embodiment, the support of foams 16 and the air convection of the air cavities 162 make each bulge 18 and the air flow channel 19 are easy to recover to the bulge state, a bulge 18 is added to each of the inner toe portion 23a, outer toe portion 23b and outer arch portion 32b to make the bottom of the sole of the foot evenly stressed and increase the comfort of the foot.

Figure 11:
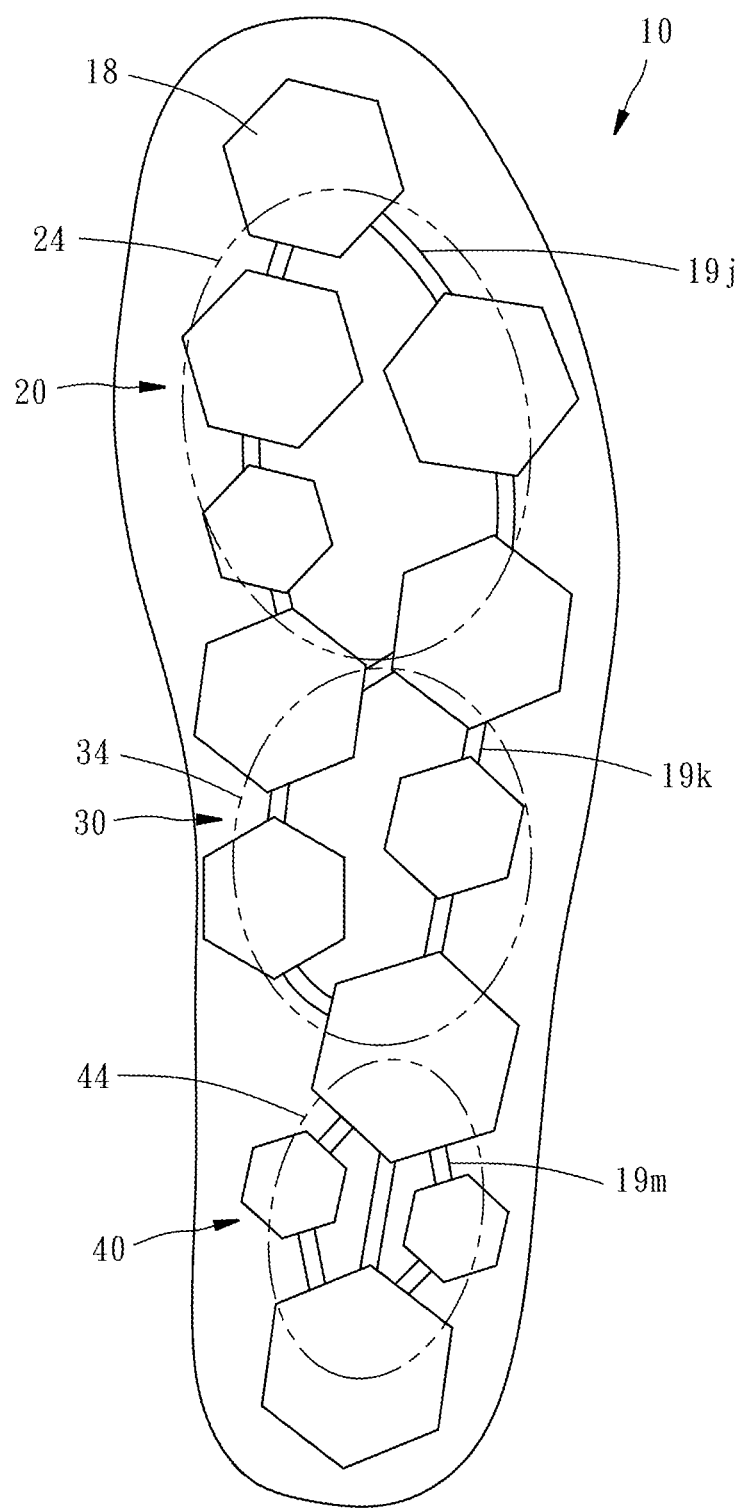
FIG. 11 is a top plan view of the insole provided by the third embodiment of the present invention, showing another aspect of the insole processed according to the insole processing method provided by the first or second embodiment of the present invention.

Please refer to FIG. 11, the insole body 10 of the insole 1 provided by the third embodiment of the present invention mainly comprises a plurality of bulges 18 and a plurality of air flow channels 19 connected to the bulges 18. The material, distinguished parts and components of the insole 1 of this third embodiment are slightly the same as the first embodiment, and the differences are outlined hereinafter:

The forefoot area 20 of the insole body 10 of the third embodiment of the present invention comprises a first circular path 24, the midfoot area 30 comprises a second circular path 34, and the hindfoot area 40 comprises a third circular path 44. The forefoot area 20 of the insole body 10 of this embodiment comprises a plurality of bulges 18, which are arranged along the first circular path 24. In addition, the air flow channel 19 also comprises a plurality of eleventh air flow channels 19j. These eleventh air flow channels 19j are located in the first circular path 24, connecting the bulges 18 of the forefoot area 20. Similarly, midfoot area 30 also comprises a plurality of bulges 18 arranged along the second circular path 34. The midfoot area 30 also comprises a plurality of twelfth air flow channels 19k, and the twelfth air flow channels 19k connect the bulges 18 of the midfoot area 30. In addition, the hindfoot area 40 further comprises a plurality of bulgesl 8 arranged along the third circular path 44, and a plurality of thirteenth air flow channels 19m connecting the bulges 18 of the hindfoot area 40.

It should be noted that the number and size of the bulges 18 of the insole 1 of the third embodiment in the forefoot area 20, midfoot area 30 and hindfoot area 40 are not limited to the arrangement shown in FIG. 11, and it simply needs to arrange the bulges 18 along the first, second and third circular paths 24, 34, 44.

Figure 12:
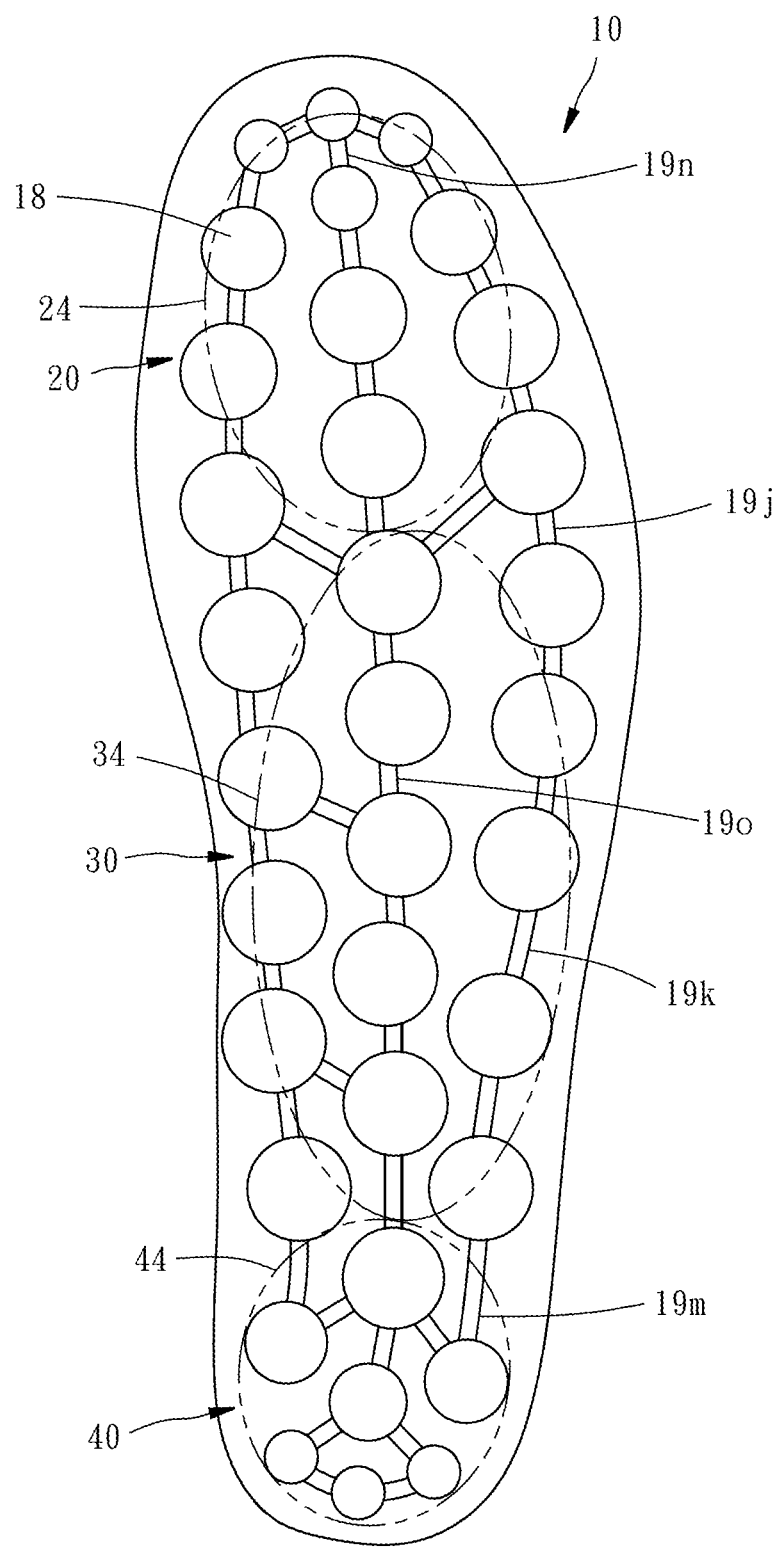
FIG. 12 is a top plan view of the insole provided by the fourth embodiment of the present invention, showing another aspect of the insole processed according to the insole processing method provided by the first or second embodiment of the present invention.

Please refer to FIG. 12, which shows the insole body 10 of the insole 1 provided by the fourth embodiment of the present invention. The material, distinguished parts and components of the insole body 10 of this fourth embodiment are slightly the same as the third embodiment, and the differences are outlined hereinafter:

In this fourth embodiment, in addition to that the forefoot area 20, midfoot area 30 and hindfoot area 40 of the upper insole layer 12 of the insole body 10 have bulges 18 arranged along the first, second and third circular paths 24,34,44 as the arrangement of the third embodiment, a plurality of bulges 18 are vertically arranged between the first, second and third circular paths 24,34,44. And each of the forefoot area 20, midfoot area 30 and hindfoot area 40 comprises a plurality of fourteenth air flow channels 19n and a plurality of fifteenth air flow channels 19o. The fourteenth air flow channels 19n connect the bulges 18 that are vertically arranged in the first circular path 24, and also connect the bulges 18 arranged vertically in the first circular path 24 and the bulges 18 located on the first circular path 24. In addition, the fifteenth air flow channels 19o connect the bulges 18 that are vertically arranged in the second circular path 34, and also connect the bulges 18 arranged vertically in the second circular path 34 and the bulges 18 located on the second circular path 34.

In summary, in the insole 1 processing method of the present invention, according to the properties of the insole substrate, such as density, heat resistance, etc., you can optionally paste foams 16 between the unprocessed upper and lower insole layers 12, 14, and directly put the semi-finished product of the assembled insole body 10 through cold pressing. Alternatively, you can cold press the upper insole layer 12 first, so that the upper insole layer 12 has a groove 12a and a concave runner 12b that can accommodate foams 16, then attach the foams 16, and then perform secondary cold pressing to obtain an insole 1, which can effectively simplify the process. In addition to not having to consider the heat-resistant requirements of the mold material, the industry can apply appropriate processing procedures according to the nature of the insole 1 substrate to improve production efficiency. The insole 1 provided by the present invention is provided with breathable and high resilience foams 16 at the stress points of the sole of the foot such as heel portion 42, inner arch portion 32a and metatarsal portion 22. With the air flow channel 19 and the air cavity 162, the foams 16 can be deformed between the diastolic state and the compressed state, so that the insole body 10 can completely fit the foot shape. It solves the problem of deformation and collapse of the conventional insole after a long time of use, and reduces the foot pain caused by standing or walking for a long time.

What is claimed is:

1. An insole processing method for making an insole comprising an insole body, said insole body comprising an upper insole layer and a lower insole layer, said upper insole layer comprising a top surface and an opposing bottom surface, the processing method comprising the steps of:
    a) cold pressing said upper insole layer to form a groove on said upper insole layer at a position corresponding to at least one of the heel portion, inner arch portion, outer arch portion, inner metatarsal portion, outer metatarsal portion, inner toe portion and outer toe portion of the structure of the human foot, said groove being located in said bottom surface of said upper insole layer;
    b) bonding said lower insole layer to said bottom surface of said upper insole layer; and
    c) performing cold pressing forming;

wherein before step b), cutting a foam and placing said foam in said groove, wherein said foam is located in said groove between said upper insole layer and said lower insole layer.

2. An insole processing method for making an insole comprising an insole body, said insole body comprising an upper insole layer and a lower insole layer, said upper insole layer comprising a top surface and an opposing bottom surface, the processing method comprising the steps of:
 a) cold pressing said upper insole layer to form a groove on said upper insole layer at a position corresponding to at least one of the heel portion, inner arch portion, outer arch portion, inner metatarsal portion, outer metatarsal portion, inner toe portion and outer toe portion of the structure of the human foot, said groove being located in said bottom surface of said upper insole layer;
 b) bonding said lower insole layer to said bottom surface of said upper insole layer; and
 c) performing cold pressing forming;
 wherein in step a), a plurality of grooves are formed in said upper insole layer, and a concave runner is formed between each two adjacent said grooves to connect said grooves;
 wherein before step b), cutting a foam and placing said foam in said concave runner, wherein the foam is located in said concave runner between said upper insole layer and said lower insole layer.

3. The insole processing method as claimed in claim 2, wherein the depth of said concave runner is shallower than the depth of said grooves.

4. A processing method for making an insole, said insole comprising an insole body, said insole body comprising an upper insole layer and a lower insole layer, said upper insole layer comprising a top surface and an opposing bottom surface, the processing method comprising the steps of:
 a) bonding at least one foam to said bottom surface of said upper insole layer at positions corresponding to at least one of the heel portion, inner arch portion, outer arch portion, inner metatarsal portion, outer metatarsal portion, inner toe portion and outer toe portion of the structure of the human foot;
 b) bonding said lower insole layer to said bottom surface of said upper insole layer; and
 c) performing cold pressing forming;
 wherein each said foam has a gap formed therein, said gap defining an air cavity.

5. The insole processing method as claimed in claim 4, wherein in step a), bonding at least two foams to said bottom surface of said upper insole layer, and bonding an elongated foam between each two said foams, said elongated foam having two opposite ends thereof respectively connected to said two foams.

6. The insole processing method as claimed in claim 4, wherein before performing said cold pressing forming, a heating step is performed, and the heating temperature of said heating step is set between 120° C. and 160° C.

7. The insole processing method as claimed in claim 4, wherein in step c), the temperature of said cold pressing forming is controlled below 30° C., the cold pressing time is 50 to 70 seconds, and the pressure is 50 kg/cm2.

8. The insole processing method as claimed in claim 4, wherein said upper insole layer and said lower insole layer are made of a copolymer foam material.

\* \* \* \* \*